United States Patent [19]
Morikuni et al.

[11] Patent Number: 5,978,526
[45] Date of Patent: Nov. 2, 1999

[54] METHOD, MULTI-CHANNEL OPTICAL INTERCONNECT DEVICE, AND A MULTI-CHANNEL OPTICALLY INTERCONNECTED ELECTRONIC DEVICE FOR MINIMIZING CROSS-TALK BETWEEN A PLURALITY OF OPTICAL SIGNALS

[75] Inventors: James Jiro Morikuni, Itasca; Austin Vincent Harton, Oak Park; Jang-Hun Yeh, Streamwood, all of Ill.

[73] Assignee: Motorola, Inc., Schaumburg, Ill.

[21] Appl. No.: 08/994,526

[22] Filed: Dec. 19, 1997

[51] Int. Cl.⁶ ....................................................... G02B 6/12
[52] U.S. Cl. .............................................. 385/14; 359/173
[58] Field of Search ........................ 385/31, 115, 12–14; 359/173; 372/38

[56] References Cited

U.S. PATENT DOCUMENTS

| | | |
|---|---|---|
| 4,720,634 | 1/1988 | D'Auria et al. . |
| 4,871,224 | 10/1989 | Karstensen et al. . |
| 5,061,027 | 10/1991 | Richard . |
| 5,101,460 | 3/1992 | Richard . |
| 5,182,780 | 1/1993 | Robertson . |
| 5,237,434 | 8/1993 | Feldman et al. . |
| 5,369,656 | 11/1994 | Ackley et al. ............................ 372/38 |
| 5,500,912 | 3/1996 | Alonas et al. . |
| 5,557,693 | 9/1996 | Stevens et al. ........................... 385/24 |
| 5,684,308 | 11/1997 | Lovejoy et al. ......................... 257/184 |

*Primary Examiner*—Akm E. Ullah
*Attorney, Agent, or Firm*—K. Cyrus Khosravi

[57] ABSTRACT

The present invention provides a method and multi-channel optical interconnect device (28) including an optical substrate (29) including a first optical channel (30) having a first predetermined thickness, a second optical channel (32) having a second predetermined thickness, and an optically isolating intermediate section (34) connected to the first optical channel (30) and to the second optical channel (32), the optically isolating intermediate section (34) having a third predetermined thickness, wherein the third predetermined thickness is less than either of the first predetermined thickness and the second predetermined thickness for minimizing optical cross-talk between the first optical channel (30) and the second optical channel (32).

20 Claims, 5 Drawing Sheets

5,978,526

METHOD, MULTI-CHANNEL OPTICAL INTERCONNECT DEVICE, AND A MULTI-CHANNEL OPTICALLY INTERCONNECTED ELECTRONIC DEVICE FOR MINIMIZING CROSS-TALK BETWEEN A PLURALITY OF OPTICAL SIGNALS

FIELD OF THE INVENTION

This invention relates generally to electronic devices that include optical interconnections between components on a printed circuit board, and in particular, to such devices wherein the optical interconnections are made through multi-channel optical interconnections.

BACKGROUND OF THE INVENTION

Printed circuit boards are known in the art. Common printed circuit boards comprise metal traces to transmit an electrical signal between components mounted on a substrate. As the number of components on a printed circuit board increases, the number of metal traces needed to connect the components also increases. This decreases the spacing between metal traces, which can lead to capacitance problems between the metal traces and space constraints due to the limited area available on the printed circuit board for metal traces.

It has been proposed to utilize optical interconnection to transmit optical signals between components, particularly components located on remote regions of the board. The optical signals are composed of modulated light beams that carry data between components. An optical emitter, such as a laser, is mounted on one region of the board and emits the optical signal. This optical signal is routed by an optical guide, such as a layer composed of molded plastic, to an optical detector mounted on a second region of the board.

One approach to connecting an optical emitter and an optical detector is through waveguides, similar to an optical fiber, attached to or formed on the surface of the board. However, the interface between the component, i.e., the emitter or detector, and the optical waveguide is difficult to fabricate. Also, there is still the difficulty of having to fit the optical waveguides within the space of the board, similar to the problem with metal traces.

Another approach is to direct the signal from the emitter away from the surface of the board and then redirect, by means of a holographic element or a reflective surface, the signal toward the surface of the board at the site of the detector. Heretofore, this has required that the emitted signal be directed away from the board at an acute angle so that the targeted detector intercepts the reflected signal. Careful placement of several components and the reflecting surface or element is needed in order to assure accurate targeting of the optical signal. It can be difficult to align the optical emitter, the reflector, and the optical detector so that the optical signals accurately reach the optical detector. Further, if the spacing of the reflector from the board varies, the optical signal may not accurately reach the desired optical detector.

Another limitation on the prior art is the lack of flexibility in the assembly of printed circuit boards. Since the optical emitters, reflectors, and optical detectors must be mounted during assembly of the printed circuit board, there is no flexibility in adding any of these elements or adjusting their position once the printed circuit board has been fabricated.

A further limitation of the prior art is that when a plurality of optical signals are interconnected between the various components on the electronic boards, cross-talk is produced between the optical signals. The cross-talk results in the erroneous communication between the components.

Consequently, there is a need for a method, an optical interconnect device, and an optically interconnected electronic device for minimizing cross-talk between the optical signals.

DETAILED DESCRIPTION OF PREFERRED EMBODIMENT(S)

Figure 1:
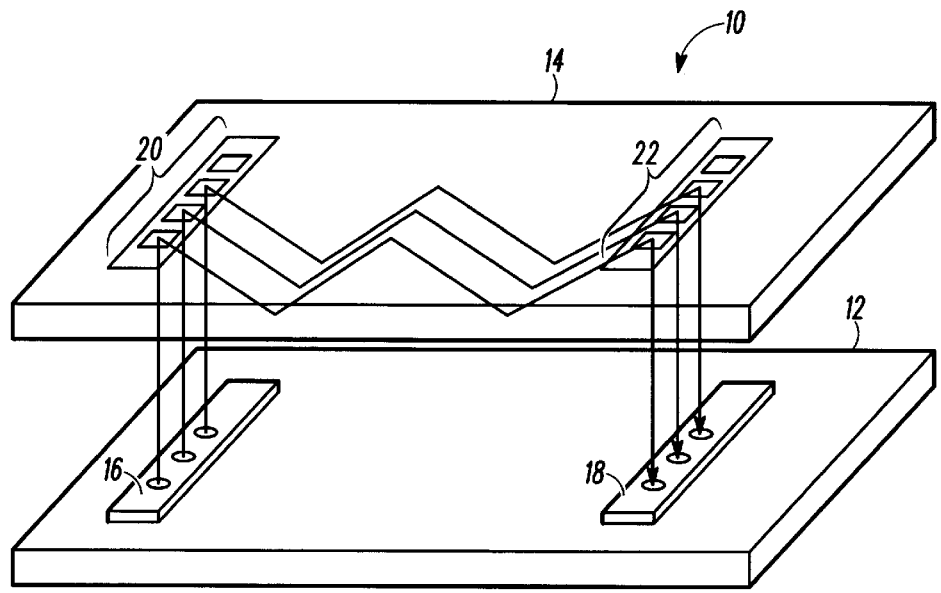
FIG. 1 is a schematic representation of a perspective view of a proposed optically interconnected electronic device.

It has been proposed that in order to provide an optically interconnected electronic device a plurality of optical signals may be directed through an optical interconnect substrate for reception by a corresponding plurality of optical detectors on an opto-electronic substrate. FIG. 1 is a schematic representation of a perspective view of a proposed optically interconnected electronic device 10. The optically interconnected electronic device 10 includes a substrate 12 and an optical interconnect substrate 14 overlying the substrate 12 and spaced apart therefrom. Mounted on the substrate 12 are a plurality of optical emitters 16 for emitting optical signals in a direction away from the substrate 12 and a plurality of optical detectors 18 spaced apart from the plurality of optical emitters 16, for detecting signals in a direction toward the substrate 12. The optical interconnect substrate 14 further includes a plurality of inputs and outputs for receiving and directing optical signals. The inputs and outputs are optical elements such as holographic optical elements. A plurality of optical signals are received by a plurality of input holographic optical elements 20 and redirected along an optical path within the optical interconnect substrate 14. A plurality of output holographic optical elements 22 receive the plurality of the redirected optical signals and further redirect the plurality of optical signals to the corresponding plurality of optical detectors 18.

It has been realized that the above-described arrangement in FIG. 1 may be rendered inoperative because of cross-talk between adjacent optical signals directed along the optical interconnect substrate 14. During the operating conditions, the optical signals that are being directed along the optical interconnect substrate 14 are spatially close to each other. This spacial limitation results in cross-talk between the adjacent optical signals and, therefore, transfer of erroneous information. Thus, there is a need to optically isolate each individual optical signal directed along the optical interconnect substrate.

Figure 2:
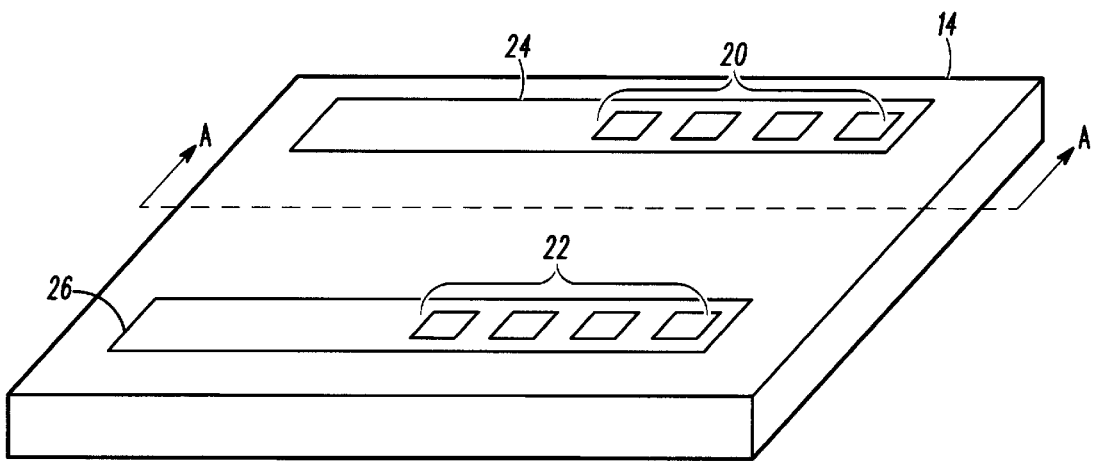
FIG. 2 is a schematic representation of a perspective view of the optical interconnect substrate of the electronic device of FIG. 1.

FIG. 2 is a schematic representation of a perspective view of the optical interconnect substrate of the optically interconnected electronic device shown in FIG. 1. FIG. 2 shows an input region 24 and an output region 26 having the plurality of input holographic optical elements 20 and the plurality of output holographic optical elements 22 thereon for receiving and redirecting optical signals from the plurality of optical emitters to the plurality of optical detectors.

Figure 3:
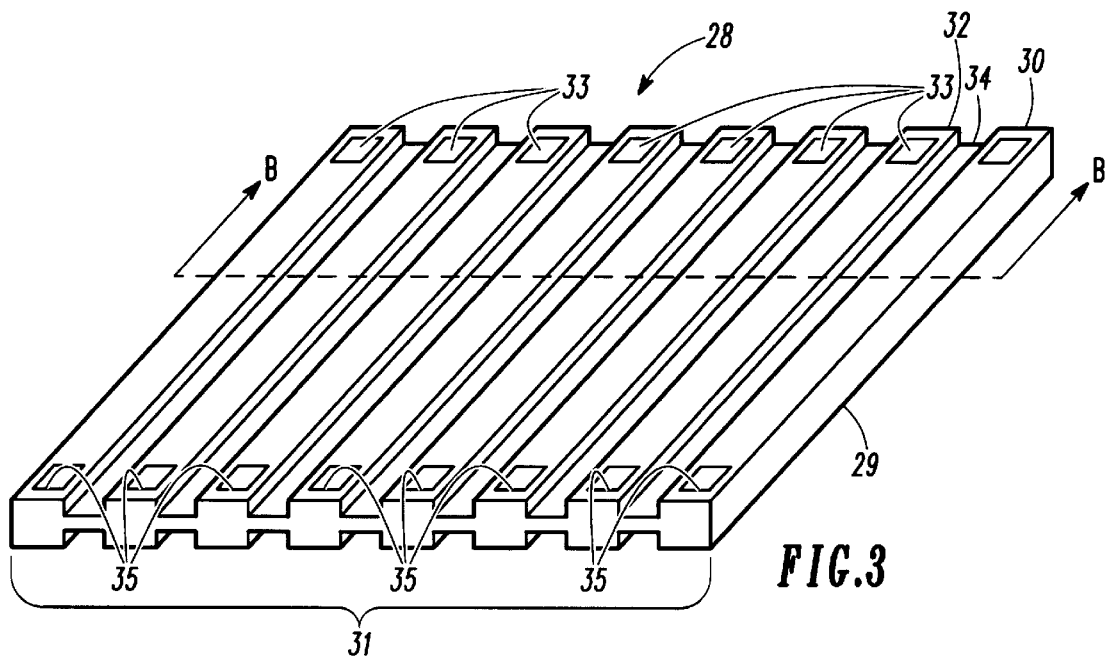
FIG. 3 is a schematic representation of a perspective view of a first embodiment of a multi-channel optical interconnect device in accordance with the present invention.

FIG. 3 is a schematic representation of a perspective view of a first embodiment of a multi-channel optical interconnect device in accordance with the present invention. The multi-channel optical interconnect device 28 (also referred to as multi-channel optical interconnect substrate) comprises an optical substrate 29 including at least a first optical channel 30, having a first predetermined thickness, a second optical channel 32, having a second predetermined thickness, of a plurality of optical channels 31. An optically isolating intermediate section 34 connects the first optical channel 30 to the second optical channel 32. The optically isolating intermediate section 34 having a third predetermined thickness, wherein the third predetermined thickness is less than either of the first predetermined thickness and the second predetermined thickness for minimizing optical cross-talk between the first optical channel 30 and the second optical channel 32. The plurality of optical channels 31 have a plurality of input unit holographic optical elements 33 and a plurality of output unit holographic optical elements 35 thereon.

In a preferred embodiment of the present invention, the multi-channel optical interconnect device 28 may be an optically transparent plastic, glass material or any other optically suitable material known in the art. The multi-channel optical interconnect device of the present invention may be fabricated by providing a single optical substrate 29 and cutting grooves therein such that a plurality of optical channels are formed in the optical substrate 29. By providing optical channels, optical signals are confined and directed within the respective optical channels, hence, minimizing optical signal cross-talk.

Figure 4:
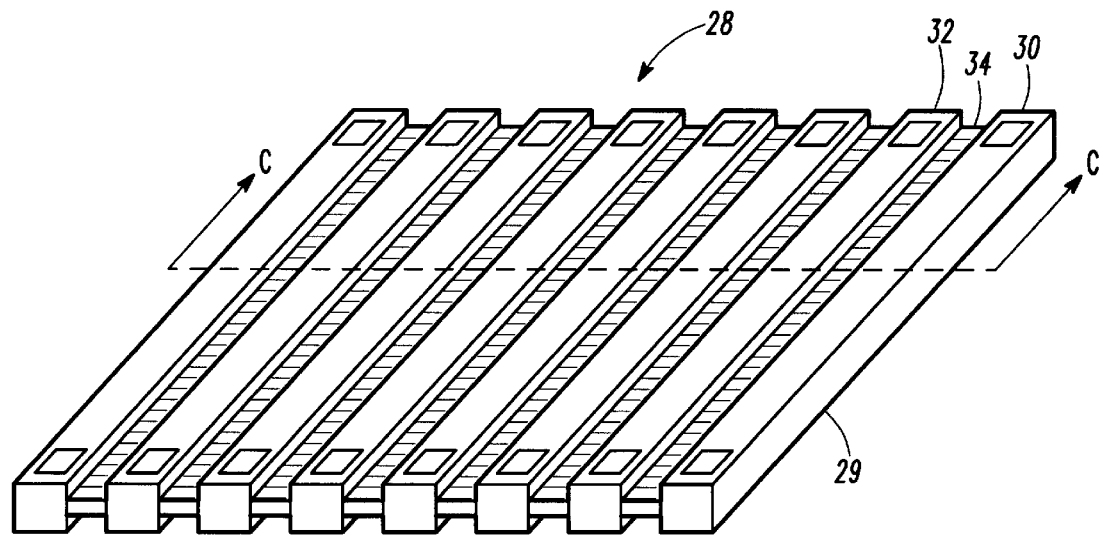
FIG. 4 is a schematic representation of a perspective view of a second embodiment of a multi-channel optical interconnect device in accordance with the present invention.

FIG. 4 is a schematic representation of a perspective view of a second embodiment of a multi-channel optical interconnect device in accordance with the present invention. In the second embodiment, the multi-channel optical interconnect device 28 is provided in such a manner that the plurality of the optical channels 31 are individually fabricated and assembled into a single multi-channel optical interconnect device. The plurality of optical channels are attached to each other via optically isolating nontransmissive intermediate sections. This is in contrast to the structural arrangement of the first embodiment, wherein the optically isolating intermediate section is provided by cutting grooves into the optical substrate 29. The optically isolating nontransmissive intermediate sections in the second embodiment of the present invention are optically opaque material or the like known in the art. In the second embodiment of the present invention, because of physical separation between the individual optical channels, cross-talk between the optical signals is minimized and essentially eliminated.

Figure 5:
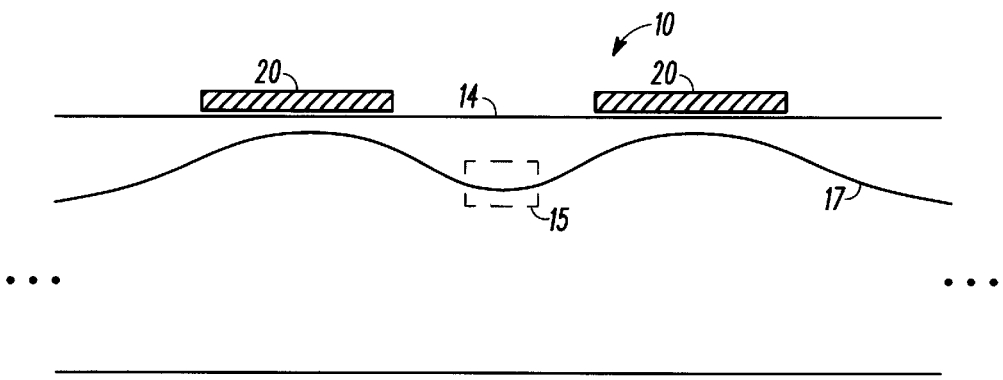
FIG. 5 is a schematic representation of optical signal intensity profile of the optical interconnect substrate of FIG. 2.

FIG. 5 is a schematic representation of optical signal intensity profile of the optical signals directed within the optical interconnect substrate of FIG. 2. Referring to FIG. 5, depicting a cross-sectional view along line A—A of FIG. 2, there is no optical isolation of the optical signals that are directed through the optical substrate 14. The adjacent optical signals that are directed along the optical substrate 14 overlap with each other in their adjacent region 15 which results in optical cross-talk between the respective optical signals. Referring to FIG. 5, the numeral 17 is a representation of the intensity profile of two exemplary adjacent optical signals. Each optical signal has a relatively higher intensity in the center (as shown by the peaks of the profile) and a relatively lower intensity (as shown by the trough) at the adjacent region 15. It is old and known that as an optical signal or a beam of light is directed in a direction, the center of the beam of light exhibits higher intensity, whereas the periphery of the beam of light exhibits lower intensity. Hence, is obtained the intensity profiles of two exemplary adjacent optical signals in FIG. 5.

Figure 6:
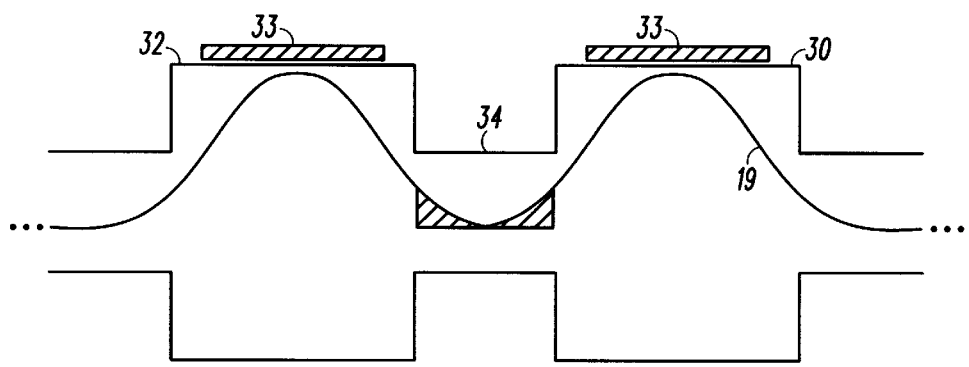
FIG. 6 is a schematic representation of optical signal intensity profile of the first embodiment of the multi-channel optical interconnect device.

FIG. 6 is a schematic representation of optical signal intensity profile of a first embodiment of the multi-channel optical interconnect device. As shown in FIG. 6, depicting a cross-sectional view along line B—B of FIG. 3, the first optical channel 30 and the second optical channel 32 respectively form the regions within which the respective optical signals are confined and directed. In this manner, optical cross-talk between the adjacent optical signals is minimized. Optical cross-talk occurs in a relatively small region of the optically isolating intermediate section 34 which has a thickness less than the thickness of either the first optical channel 30 and the second optical channel 32. Referring to FIG. 6, the line indicated by numeral 19 is a representation of the intensity profile of two exemplary adjacent optical signals. Each optical signal has a relatively higher intensity in the center (as shown by the peaks of the profile) and a relatively lower intensity (as shown by the trough) at the intermediate region 34.

Figure 7:
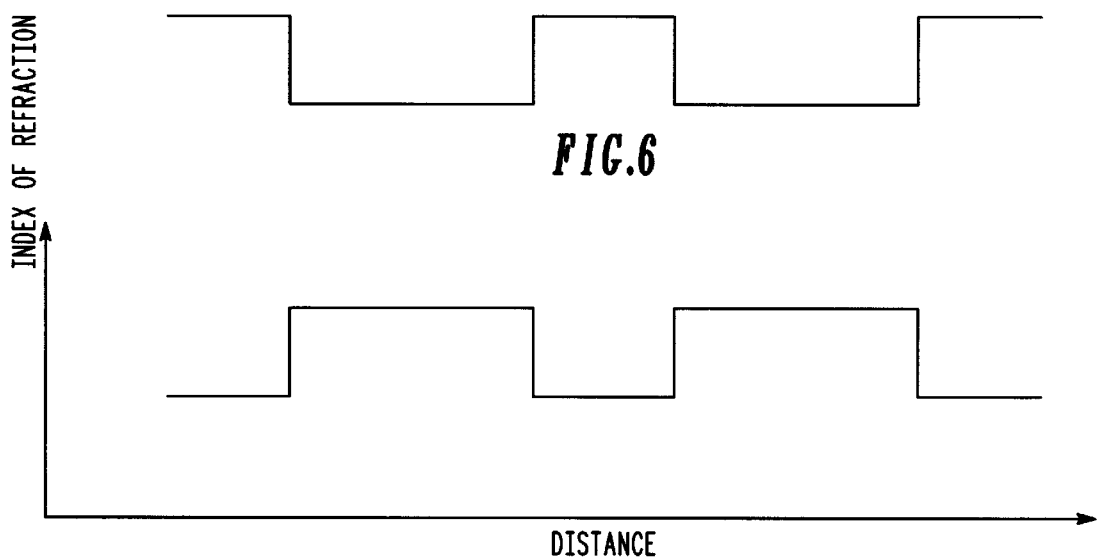
FIG. 7 is a representation of an effective refractive index profile corresponding to the structural arrangement of the first embodiment of the multi-channel optical interconnect device illustrated in FIG. 6.

FIG. 7 is a representation of an effective refractive index profile corresponding to the structural arrangement of the first embodiment of the multi-channel optical interconnect device illustrated in FIG. 6. This representation illustrates the refractive index profile corresponding to the structural arrangement of the first optical channel 30 and the second optical channel 32 in the first embodiment of the multi-channel optical interconnect device in accordance with the present invention.

Figure 8:
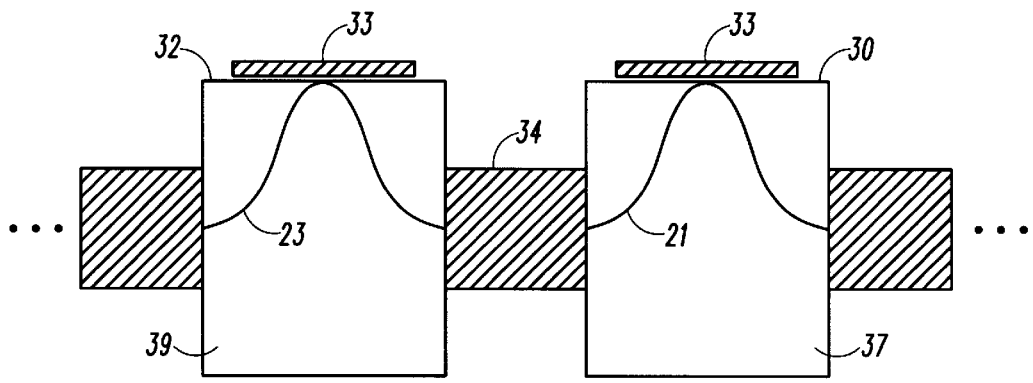
FIG. 8 is a schematic representation of optical signal intensity profile of the second embodiment of the multi-channel optical interconnect device.

FIG. 8 is a schematic representation of optical signal intensity profile of a second embodiment of the multi-channel optical interconnect device. Referring to FIG. 8, depicting a cross-sectional view along line C—C of FIG. 4, the first optical channel 30 and the second optical channel 32 respectively form regions 37 and 39 within which the respective optical signals are confined and directed. Since in the second embodiment of the multi-channel optical interconnect device of the present invention the first optical channel 30 and the second optical channel 32 are physically separated, there is essentially no optical overlap between the adjacent optical signals. Referring to FIG. 8, the lines indicated by numerals 21 and 23 are representations of the intensity profile of two exemplary adjacent optical signals. Each optical signal has a relatively higher intensity in the center as shown by the peaks of the profile.

Figure 9:
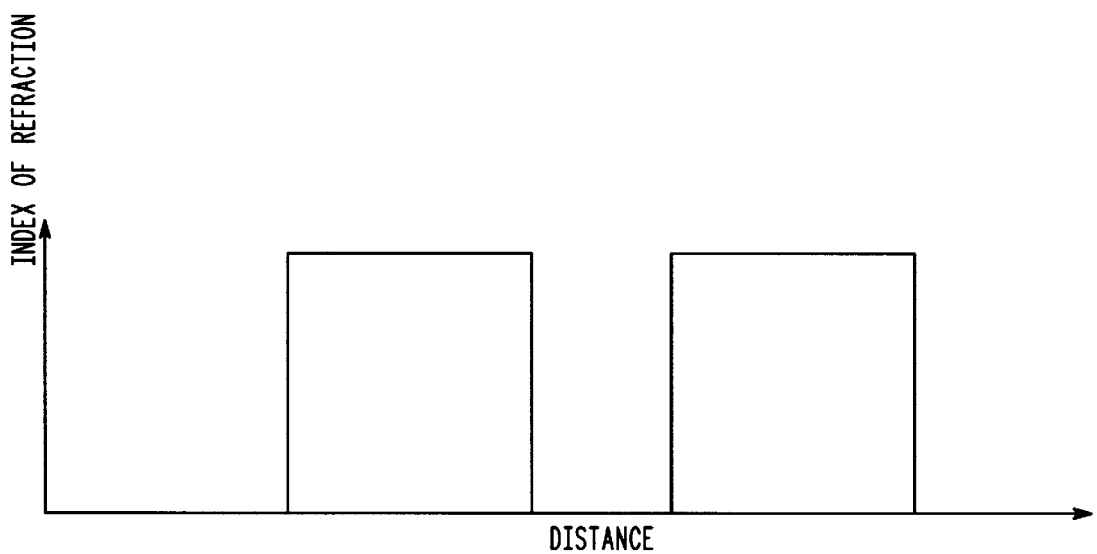
FIG. 9 is a representation of an effective refractive index profile corresponding to the structural arrangement of the second embodiment of the multi-channel optical interconnect device illustrated in FIG. 8.

FIG. 9 is a representation of an effective refractive index profile corresponding to the structural arrangement of the second embodiment of the multi-channel optical interconnect device illustrated in FIG. 8. This representation illustrates the refractive index profile corresponding to the structural arrangement of the first optical channel 30 and the second optical channel 32 in the second embodiment of the multi-channel optical interconnect device in accordance with the present invention.

Figure 10:
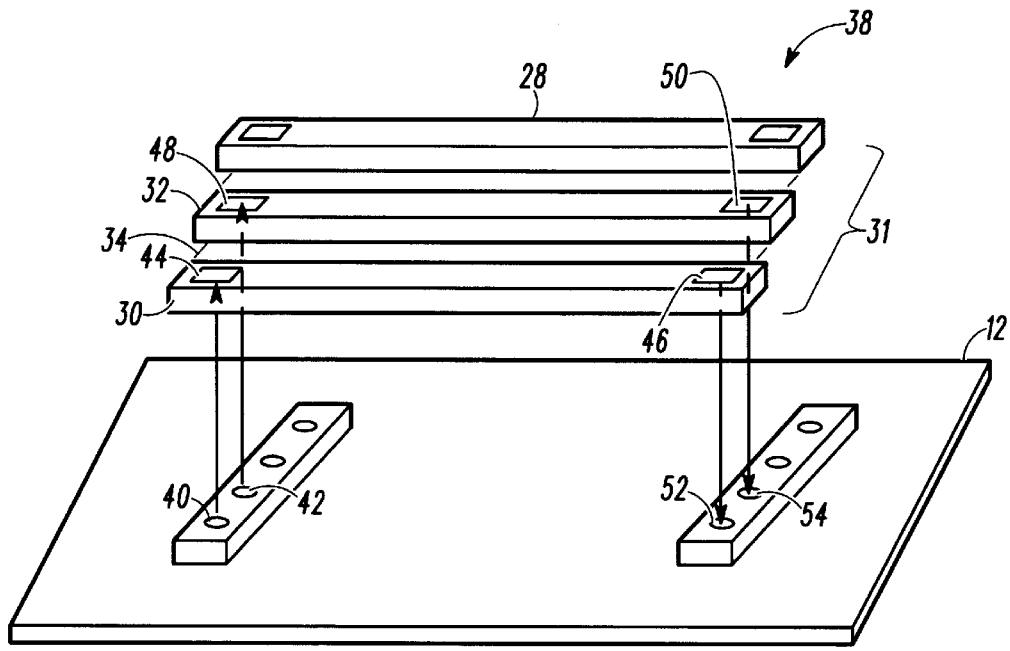
FIG. 10 is a schematic representation of a perspective view of a multi-channel optically interconnected electronic device in accordance with the present invention.

FIG. 10 is a schematic representation of a perspective view of a multi-channel optically interconnected electronic device in accordance with the present invention. The multi-channel optically interconnected electronic device 38 includes a substrate 12, a plurality of optical emitters, wherein at least a first optical emitter 40 and a second optical emitter 42 are mounted on the substrate 12 and adapted to emit a first optical signal and a second optical signal, respectively, in a direction away from the substrate 12. The multi-channel optically interconnected electronic device 38 further includes a multi-channel optical interconnect substrate (previously referred to in reference to FIG. 3 as multi-channel optical interconnect device) 28 overlying the substrate 12, such that the multi-channel optical interconnect substrate 28 is facing the substrate 12 and spaced apart therefrom. The multi-channel optical interconnect substrate 28 having a plurality of optical channels 31 wherein a first optical channel 30, optically coupled to the first optical emitter 40, having a first optical channel input unit 44 for receiving the first optical signal from the first optical emitter 40 and redirecting the first optical signal to a first optical channel output unit 46. The multi-channel optical interconnect substrate 28 having a second optical channel 32, optically coupled to the second optical emitter 42, having a second optical channel input unit 48 for receiving the second optical signal from the second optical emitter 42 and redirecting the second optical signal to a second optical channel output unit 50. A plurality of optical detectors wherein at least a first optical detector 52 and a second optical detector 54 are mounted on the substrate 12 apart from the plurality of optical emitters. The first optical detector 52 and the second optical detector 54 are adapted to detect the first optical signal and the second optical signal, respectively, from a direction toward the substrate. The first optical channel 30 has a first predetermined thickness and the second optical channel 32 has a second predetermined thickness. The first optical channel 30 and the second optical channel 32 are optically isolated via an intermediate section 34 having a third predetermined thickness, wherein the third predetermined thickness is less than either of the first predetermined thickness and the second predetermined thickness. In this manner, the multi-channel optically interconnected electronic device of the present invention provides an optical interconnection that minimizes cross-talk between the optical signals.

In a preferred embodiment, the plurality of optical emitters are vertical cavity surface emitting lasers. Alternatively, the plurality of optical emitters may be light emitting diodes. In a preferred embodiment, the plurality of optical detectors are metal-semiconductor-metal (MSM) detectors. Alternatively, the plurality of optical detectors may be avalanche photodiode or PIN detectors. Moreover, the substrate 12 in the present invention may have various electrical components mounted thereon which may be connected by metal traces (not shown).

Figure 11:
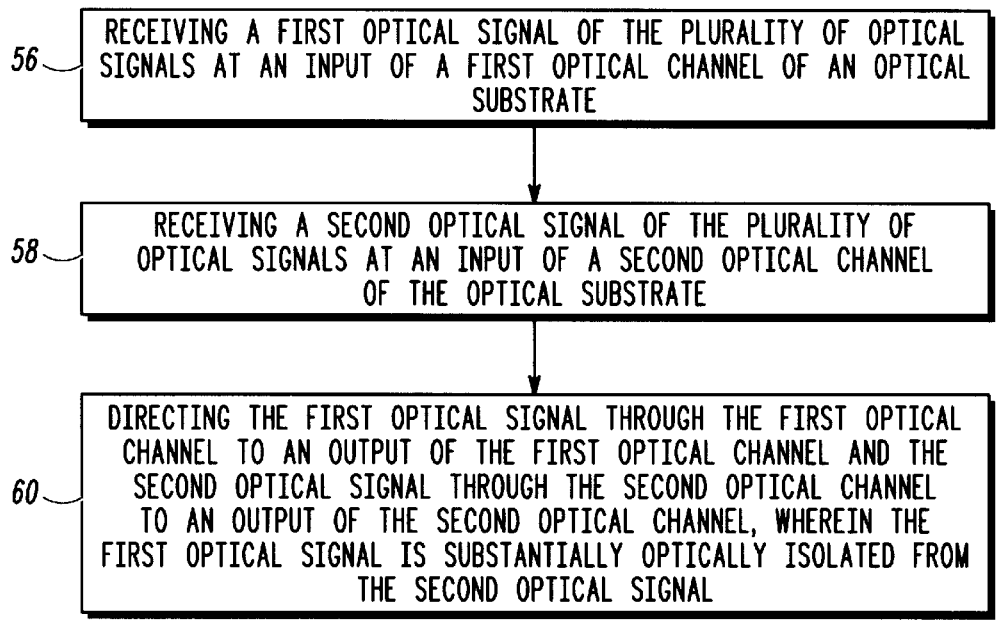
FIG. 11 is a flow chart showing one embodiment of steps in accordance with the present invention.

FIG. 11 is a graphic representation of one embodiment of steps of a multi-channel optical interconnect method for minimizing cross-talk between a plurality of optical signals in accordance with the present invention. The method includes the steps of: a) receiving a first optical signal of the plurality of optical signals at an input unit of a first optical channel of an optical substrate (56); b) receiving a second optical signal of the plurality of optical signals at an input unit of a second optical channel of the optical substrate (58); c) directing the first optical signal through the first optical channel to an output unit of the first optical channel and the second optical signal through the second optical channel to an output unit of the second optical channel, wherein the first optical signal is substantially optically isolated from the second optical signal (60).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A multi-channel optical interconnect device, comprising an optical substrate including a first optical channel having a first predetermined thickness, a second optical channel having a second predetermined thickness, and an optically isolating intermediate section connected to the first optical channel and to the second optical channel, the optically isolating intermediate section having a third predetermined thickness, wherein the third predetermined thickness is less than either of the first predetermined thickness and the second predetermined thickness for minimizing optical cross-talk between the first optical channel and the second optical channel.

2. The multi-channel optical interconnect device of claim 1, wherein the optically isolating intermediate section is optically nontransmissive.

3. The multi-channel optical interconnect device of claim 1, wherein the first optical channel and the second optical channel each have an input unit and an output unit.

4. The multi-channel optical interconnect device of claim 3, wherein the input unit and the output unit are optical elements.

5. The multi-channel optical interconnect device of claim 4, wherein each input unit is a holographic optical element.

6. The multi-channel optical interconnect device of claim 4, wherein each output unit is a holographic optical element.

7. The multi-channel optical interconnect device of claim 1, wherein the first optical channel and the second optical channel are optically transparent plastic.

8. A multi-channel optical interconnect method for minimizing cross-talk between a plurality of optical signals, comprising the steps of:

a) receiving a first optical signal of the plurality of optical signals at an input unit of a first optical channel of an optical substrate;

b) receiving a second optical signal of the plurality of optical signals at an input unit of a second optical channel of the optical substrate;

c) directing the first optical signal through the first optical channel to an output unit of the first optical channel and the second optical signal through the second optical channel to an output unit of the second optical channel, wherein the first optical signal is substantially optically isolated from the second optical signal.

9. The multi-channel optical interconnect method of claim 8, wherein the input unit of the first optical channel is an optical element.

10. The multi-channel optical interconnect method of claim 9, wherein the optical element is a holographic optical element.

11. The multi-channel optical interconnect method of claim 8, wherein the input unit of the second optical channel is an optical element.

12. The multi-channel optical interconnect method of claim 11, wherein the optical element is a holographic optical element.

13. The multi-channel optical interconnect method of claim 8, wherein the output unit of the first optical channel is an optical element.

14. The multi-channel optical interconnect method of claim 13, wherein the optical element is a holographic optical element.

15. The multi-channel optical interconnect method of claim 8, wherein the output unit of the second optical channel is an optical element.

16. The multi-channel optical interconnect method of claim 15, wherein the optical element is a holographic optical element.

17. The multi-channel optical interconnect method of claim 8, wherein the first optical channel and the second optical channel are optically isolated using an optically nontransmissive intermediate section.

18. A multi-channel optically interconnected electronic device, comprising:

a substrate;

a plurality of optical emitters wherein at least a first optical emitter and a second optical emitter are mounted on the substrate and adapted to emit a first optical signal and a second optical signal, respectively, in a direction away from the substrate;

a multi-channel optical interconnect substrate overlying the substrate, the multi-channel optical interconnect substrate facing the substrate and spaced apart therefrom;

the multi-channel optical interconnect substrate having a plurality of optical channels wherein a first optical channel, optically coupled to the first optical emitter, having a first optical channel input unit for receiving the first optical signal from the first optical emitter and redirecting the first optical signal to a first optical channel output unit;

the multi-channel optical interconnect substrate having a second optical channel, optically coupled to the second optical emitter, having a second optical channel input unit for receiving the second optical signal from the second optical emitter and redirecting the second optical signal to a second optical channel output unit;

a plurality of optical detectors wherein at least a first optical detector and a second optical detector are mounted on the substrate apart from the plurality of optical emitters and adapted to detect the first optical signal and the second optical signal, respectively, from a direction toward the substrate.

19. The multi-channel optically interconnected electronic device of claim 18, wherein the first optical channel has a first predetermined thickness and the second optical channel has a second predetermined thickness.

20. The multi-channel optically interconnected electronic device of claim 19, wherein the first optical channel and the second optical channel are connected using an optically nontransmissive intermediate section having a third predetermined thickness, the third predetermined thickness is less than either of the first predetermined thickness and the second predetermined thickness, and wherein the first optical channel and the second optical channel are optically isolated.

* * * * *